United States Patent
Duff

(10) Patent No.: US 6,704,865 B1
(45) Date of Patent: Mar. 9, 2004

(54) MICROPROCESSOR CONDITIONAL DETERMINISTIC RESET VECTOR METHOD

(75) Inventor: Brentt Curtus Duff, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/470,742

(22) Filed: Dec. 23, 1999

(51) Int. Cl.[7] .............................. G06F 9/445; G06F 9/24
(52) U.S. Cl. .......................................................... 713/2
(58) Field of Search ................................. 713/2, 1

(56) References Cited

U.S. PATENT DOCUMENTS

| | | | | |
|---|---|---|---|---|
| 4,562,495 A | * | 12/1985 | Bond et al. | 360/78.04 |
| 5,263,168 A | * | 11/1993 | Toms et al. | 713/1 |
| 5,327,531 A | * | 7/1994 | Bealkowski et al. | 714/6 |
| 5,418,918 A | * | 5/1995 | Vander Kamp et al. | 713/2 |
| 5,432,927 A | * | 7/1995 | Grote et al. | 713/2 |
| 5,938,764 A | * | 8/1999 | Klein | 713/1 |
| 6,003,130 A | * | 12/1999 | Anderson | 713/2 |
| 6,202,091 B1 | * | 3/2001 | Godse | 709/222 |
| 6,289,426 B1 | * | 9/2001 | Maffezzoni et al. | 711/173 |
| 6,330,634 B1 | * | 12/2001 | Fuse et al. | 711/103 |
| 6,425,079 B1 | * | 7/2002 | Mahmoud | 713/2 |

\* cited by examiner

*Primary Examiner*—Thomas Lee
*Assistant Examiner*—Eric Chang
(74) *Attorney, Agent, or Firm*—Jimmy L. Funke; Stefan V. Chmielewski

(57) ABSTRACT

A method for incorporating a conditional reset vector into a microprocessor's boot system to scan memory for a reset vector locator for finding valid boot software throughout the microprocessor's memory space. The conditional reset vector method of the present invention contains conditional logic that determines where in memory the reset vector locator can be found.

13 Claims, 3 Drawing Sheets

MICROPROCESSOR CONDITIONAL DETERMINISTIC RESET VECTOR METHOD

TECHNICAL FIELD

The present invention relates to a method for booting a microprocessor's application software and more particularly, to a booting method having a conditional deterministic reset vector.

BACKGROUND OF THE INVENTION

In general, a microprocessor's operation includes a process for initializing, or beginning, its own internal logic and/or intended software application, also known as a boot method. Within the microprocessor's internal initialization logic is a reset vector that is used to point to the location of the executing instructions for the operating system or other application software.

Typically, existing boot methods for application software jump to a fixed address in memory space, and then begin executing the software application at the fixed memory location. One of the most common methods for accomplishing this objective is the use of a power-on reset vector. The reset vector is in a fixed memory location. The microprocessor reads the data in the reset vector location, which contains a pointer for the location of the memory address to begin executing the application software.

The fixed reset vector method has straightforward logic associated therewith. Upon power-on, a microprocessor will load its program counter, a register containing the current address for executing the software application, with the data contents stored in the reset vector's memory address. So for example, the reset vector has addresses $FFFE and $FFFF which contain the data 0F and 2E. During power-on reset, the microprocessor will load the data contents of $FFFE and $FFFF into the microprocessor's program counter register. At this point, the program counter register contains the data $0F2E, which is an address in memory space that contains the boot software for the intended software application. The data content of the fixed reset vector is the first address for the executable software. So the executable software must always remain at this fixed memory address location.

A problem that is often encountered with this prior art method is that the reset vector logic creates problems when the application's programmable memory is erased. Erasing the programmable memory, which is sometimes done when the microprocessor is reprogrammed, will leave the reset vector and the application boot software in an erased, or blank, state, which can cause serious, if not unrecoverable, errors.

For example, before a microprocessor can be reprogrammed, the memory space must be erased. If the reset vector is erased, or left blank, the microprocessor has no way of locating either booting or execution software for the application software upon power-on reset. The result is that the microprocessor cannot be re-booted to allow for reprogramming. This situation is sometimes referred to as a "braindead" processor. A "braindead" processor cannot communicate to enable the programming of its memory space.

One way to overcome this problem, is to design a microprocessor having a non-erasable address dedicated for boot-memory. In this design, the reset vector and its data are located in the non-erasable address dedicated to boot memory. Therefore, the reset vector and boot software are available to the microprocessor if a power-on reset occurs during a reprogramming event. Communication routines can also be added to the non-erasable boot memory to allow for programming of the application memory. However, the use of dedicated non-erasable boot memory space can be very expensive and is difficult to change making it inflexible.

In the automotive industry in particular, flexibility is key to the small controllers that are used in many automotive applications. Due to size and weight restrictions, automotive applications often employ these small controllers and the controllers are often reprogrammed for upgrades, requiring the memory be erased. Dedicating non-erasable memory space on these small controllers is contrary to the need for flexibility.

SUMMARY OF THE INVENTION

The present invention is a conditional reset vector method. According to the present invention, the microprocessor will always have boot software in memory space that can be located and executed.

According to the present invention, the reset vector contains conditional logic that determines the memory location of the executable software. The microprocessor's conditional logic software is used to conditionally determine where executable software is in memory space. For example, an IF, THEN, ELSE statement, a DO WHILE loop, or an DO UNTIL loop, are all options available within a microprocessor that can be manipulated to provide logic to conditionally determine the location of a memory space containing executable software. The actual conditions for the logic statements will depend on the specific application.

It is an object of the present invention to create a fail-safe method for booting a microprocessor. It is another object of the present invention to create a fail-safe method for booting application software on a microprocessor. Yet another object of the present invention is to provide a booting system for a microprocessor that avoids "brain death" of the microprocessor when the programmable memory is erased for microprocessor reprogramming.

Other objects and features of the present invention will become apparent when viewed in light of the detailed description of the preferred embodiment and when taken in conjunction with the attached drawings and appended claims.

BRIEF DESCRIPTION OF THE DRAWINGS

In order that the present invention may be well understood, there will now be described some embodiments thereof, given by way of example, with reference to the accompanying drawings, in which.

DESCRIPTION OF THE PREFERRED EMBODIMENT

The present invention creates a fail-safe condition for a booting system for a microprocessor. In the present invention, a conditional reset vector is used in the booting process so that in the event of a power-on reset during memory erasure, the booting process will still take place.

In the present invention, a microprocessor is altered to include logic for the conditional reset vector. The logic will search the microprocessor's memory for valid boot data, thereby avoiding any loss of critical boot data. Alteration of the microprocessor can occur in any method known in the art. For example, it is possible to make the changes necessary for the additional logic at the substrate level during manufacture of the microprocessor. It is also possible to add the logic to the microprocessor's software in the boot strategy already existing within the microprocessor. One skilled in the art is capable of determining many alternatives to successfully incorporating the conditional reset vector of the present invention to existing microprocessor technologies.

The conditional deterministic reset vector method of the present invention looks in other parts of memory, other than the same location every time as is currently known in the art. The conditional deterministic reset vector scans memory looking for a valid reset vector boot in memory. Now the reset vector address can be moved throughout the microprocessor's memory. The conditional deterministic reset vector looks for a known locator in memory to identify where the reset vector is located in memory. This locator is a known data value that is programmed into the memory at the time the reset vector's data contents is programmed. Once the rest vector locator is found by the microprocessor's internal logic, the next memory address space is the reset vector that contains the data that points to the first executable data for the intended application. The first executable data is often known as application boot code. The conditional deterministic reset vector is less restricting on the use of a single dedicated address to contain the rest vector than that which is used in the prior art fixed reset vector method.

In current microprocessor technology, memory is typically partitioned into blocks. During reprogramming of the microprocessor's application memory, it is possible to select which blocks will be affected by erasure and which will not. Therefore, it is possible to have more than one block having an address containing the boot data for the application. In this case, should one of the blocks be erased, the present invention allows the microprocessor to scan the memory and locate an address, preferably in another memory block, containing functional boot data. According to the present invention, the microprocessor will always have at least one valid boot memory space located in memory that the logic will find.

Figure 1A:
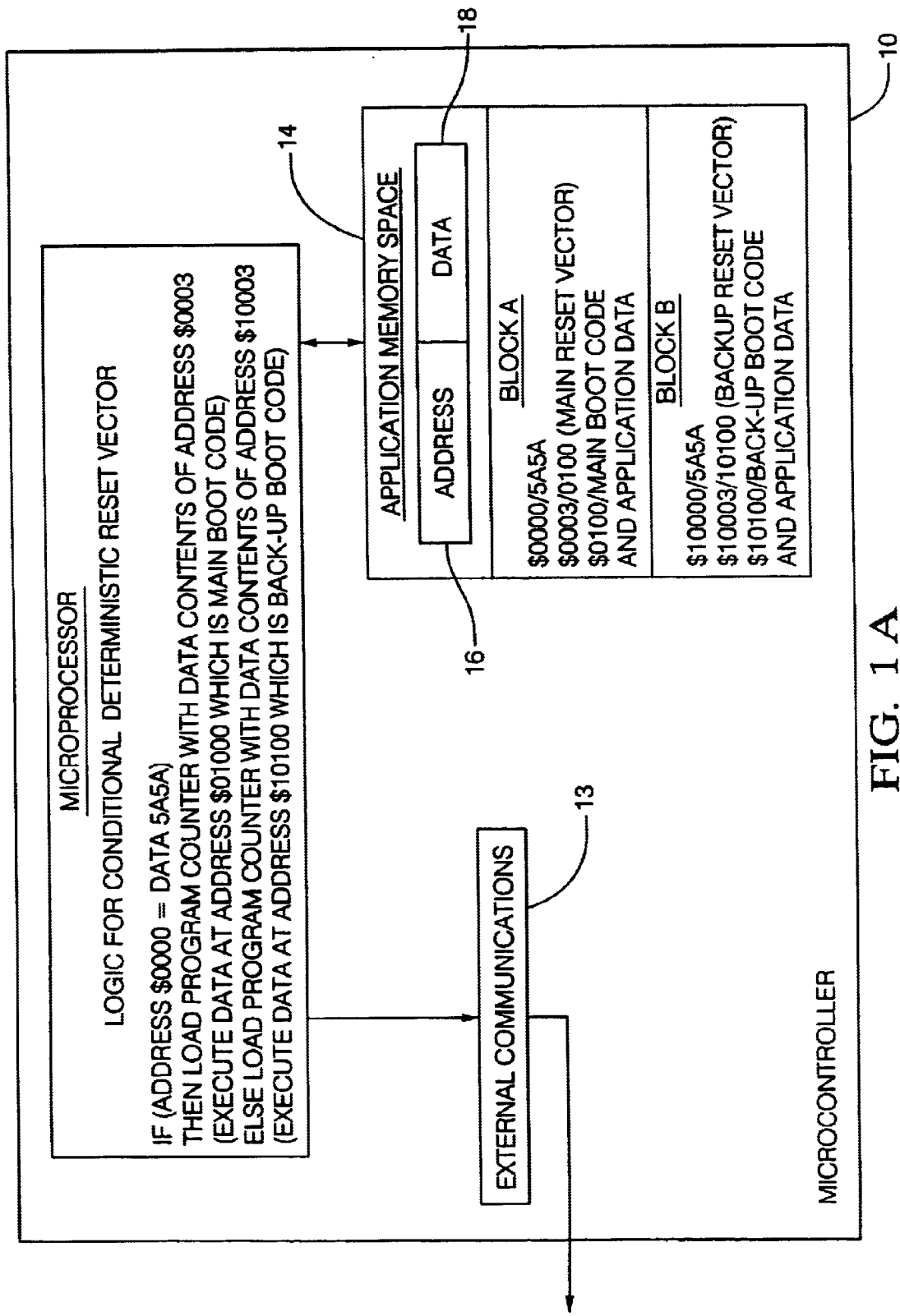
FIG. 1a block diagram of a microcontroller having partitioned blocks of memory.

For any embodiment of the method of the present invention, it is recommended that boot data always be contained, or moved between, at least two separate memory blocks. The size of the memory blocks can vary greatly depending on the microprocessor and on the specific application. One example is shown in FIG. 1a. A microcontroller 10 has a microprocessor 12, external communications 13, and application memory 14. The application memory 14 contains the address locations 16 having data 18 therein. Memory block A, in the application memory 14, has the reset vector locator at address $0000, the reset vector at address $0003, and the main boot code at address $0100. Memory block B, in the application memory 14, contains the back-up reset vector at address $10003 and the back-up boot code at address $10100. One skilled in the art is capable of determining what size blocks are applicable and how to scan the blocks based on a specific microprocessor and an intended application. Therefore, those subjects will not be discussed herein.

Figure 1B:
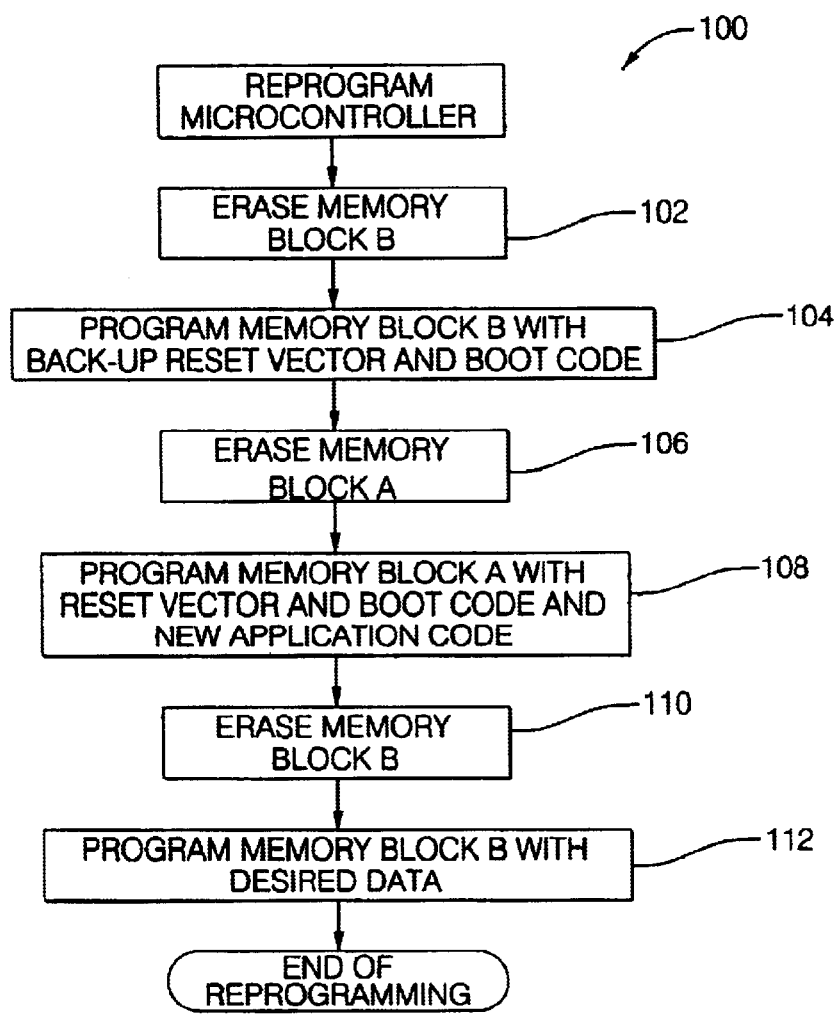
FIG. 1b is a flow chart of the general method of the conditional reset vector method of the present invention.

In any embodiment of the conditional reset vector method of the present invention, the method includes fail-safe logic for finding a valid application boot block in application memory. There are several ways that this can be done, but for any method the microprocessor should include valid boot data contained in, or moved between, two separate memory blocks, say for example, A and B. Assume that in the present example it is desired to reprogram block A of the microprocessor's memory. The general method 100 is shown and described with reference to FIG. 1b. For the present example of a reprogramming event, block B will be completely erased 102 first, and the back-up reset vector and boot code will be programmed 104 into block B. Next, memory block A will is completely erased 106 and then programmed 108 with the new reset vector, main boot code and application data. Block B is erased 110 and programmed 112 with any desired data. The flow diagram shown in FIG. 1b is merely one example. Many alternatives are available which will still result in always having microprocessor boot code in application memory when erasing and programming all of the application memory space.

As discussed earlier, there are numerous alternatives to the logic used to accomplish the conditional reset vector of the present invention, an IF, THEN, ELSE statement, a DO loop or and UNTIL loop to name just a few.

Figure 2:
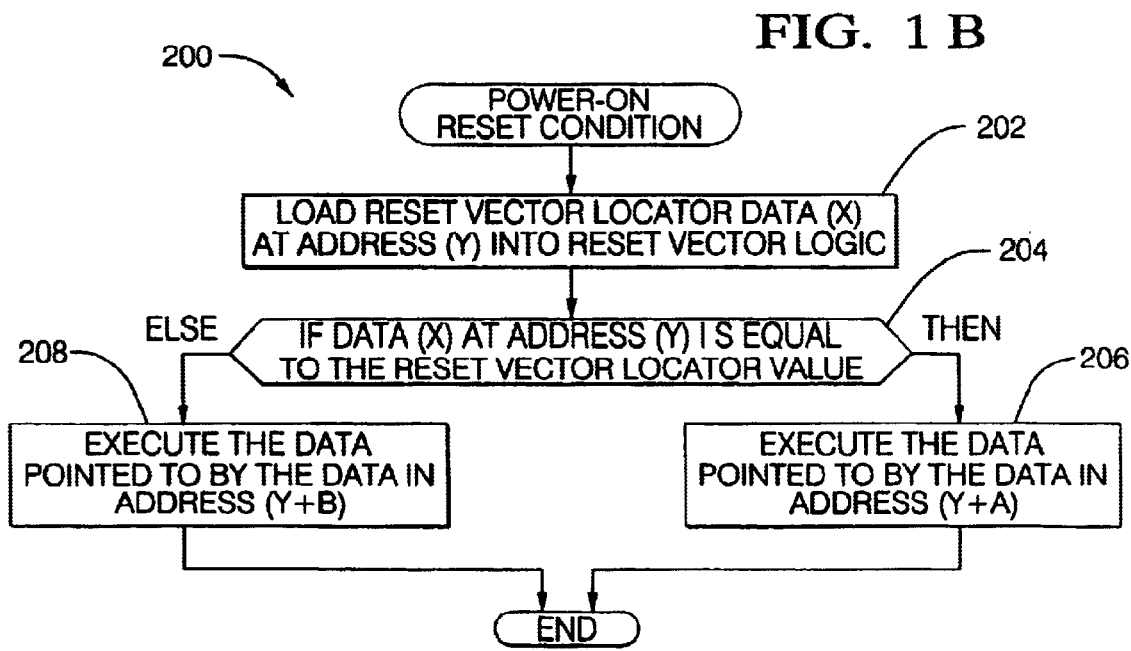
FIG. 2 is a flow chart of one embodiment of the present invention using an IF, THEN, ELSE statement.

An example of an embodiment of the conditional deterministic reset vector using an IF, THEN ELSE is shown in FIG. 2. The method 200 begins by loading 202 the reset vector locator data, X, at a specific address, Y, into the microprocessor's conditional deterministic reset vector logic. In the present example, the data X at address Y is compared 204 to a known reset vector locator value for the desired specific application. If the data contents match, the microprocessor executes 206 the data pointed to by the data in address Y+A. Y is the address of the reset vector locator and A is the data length of the reset vector locator. If the data contents do not match, the microprocessor executes 208 the data pointed to by the data in address Y+B. B is either the data length of the reset vector plus an offset to the back-up reset vector, or merely an offset to the back-up reset vector.

Other possible checks for valid boot memory space include, but are not limited to, performing a checksum of the memory space, pattern comparison or signature matching, storing a validity check value in EEPROM "non-volatile type memory" or, during reprogramming, redirecting the reset vector to a valid boot memory location. The reset vector locator is a fixed value implementation in the microprocessor. Its data contents are programmed into memory during the first initial programming event. The first initial programming event can be done through either the microprocessor's internal boot loader program or by an external, manufacturing tool. The reset vector locator has an address and a data value in application memory space and its data value is hard coded or initialized by the microprocessor's conditional reset vector logic.

Figure 3:
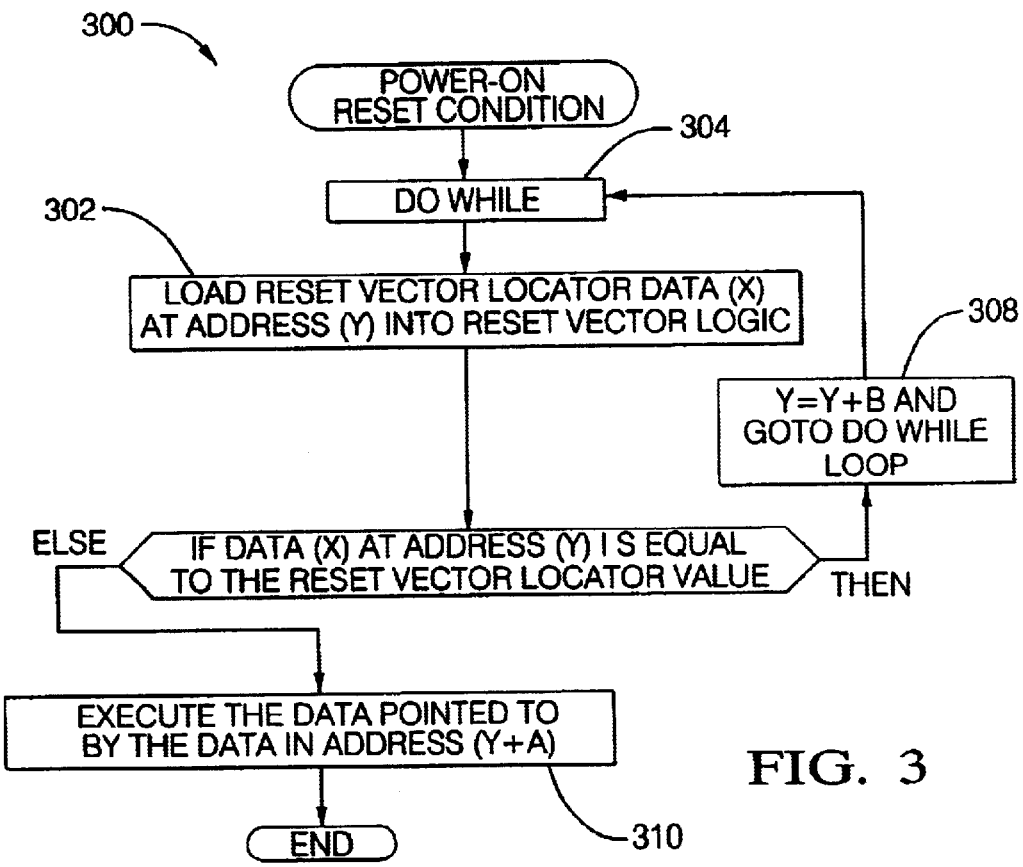
FIG. 3 is a flow chart of another embodiment of the present invention using a DO loop.

FIG. 3 is a flowchart of another embodiment of the method of the present invention using a DO WHILE loop. The method 300 begins by loading 302 the data contents X into a memory address Y. The data is compared 306 with the known reset vector. If the data X at address Y is not equal to the known reset vector locator, then address Y is set 308 to the combined address Y+B and the program continues the scanning and comparison in a DO WHILE loop 304. On the other hand, once a valid boot memory space is found, the processor executes 310 the data pointed to by that address, i.e. Y+A.

Figure 4:
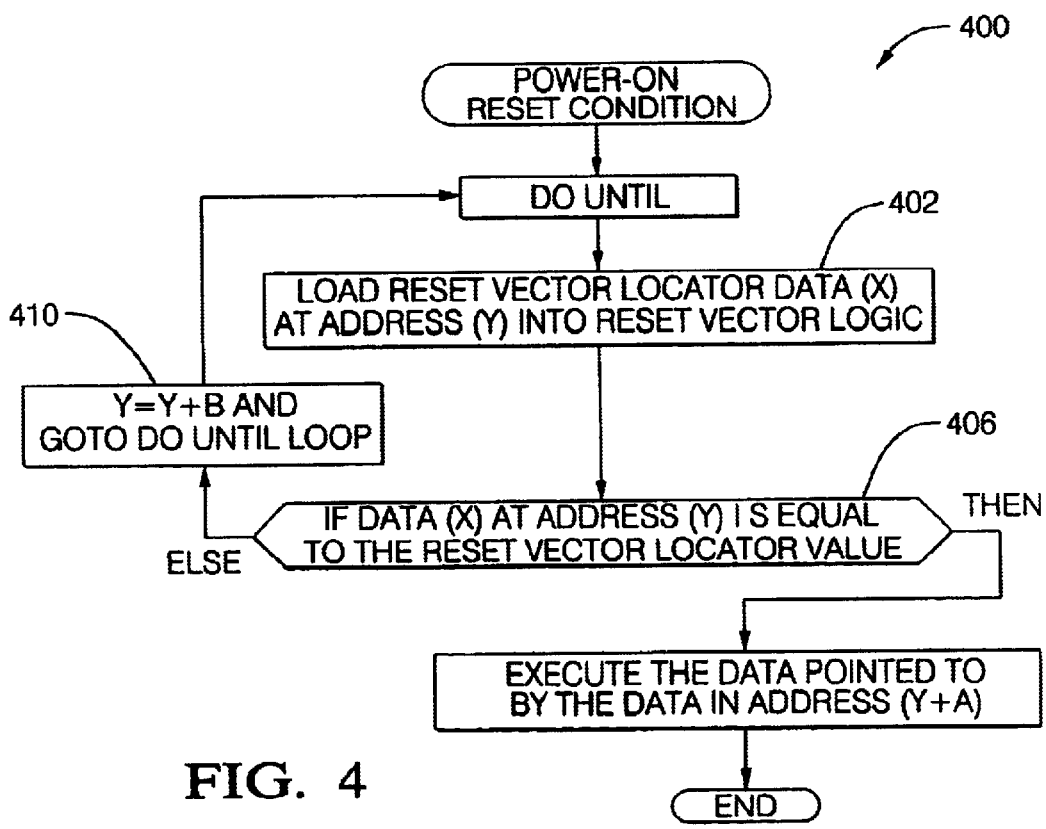
FIG. 4 is a flow chart of yet another embodiment of the present invention using an UNTIL loop.

FIG. 4 is a flowchart of yet another embodiment of the method of the present invention using an UNTIL loop. In the method 400 shown in FIG. 4, the data X is loaded 402 into address Y. The data X is compared 406 with the known reset vector locator, and if there is a match, then the processor executes 408 the data pointed to by the data at address Y+A. When, there is no match, the processor sets Y equal to Y+B 410 and repeats the loop.

While particular embodiments of the invention have been shown and described, numerous variations and alternate embodiments will occur to those skilled in the art. Accordingly, it is intended that the invention be limited only in terms of the appended claims.

What is claimed is:

1. A method for booting a microprocessor, the microprocessor having partitioned memory blocks, said method comprising the steps of:

having valid boot data for an application in at least two memory locations in separate memory blocks;

scanning memory to locate a reset vector locator;

executing an application at the valid boot memory space pointed to by said reset vector locator.

2. The method as claimed in claim 1 wherein said step of scanning memory further comprises an IF, THEN ELSE statement for locating said reset vector locator.

3. The method as claimed in claim 2 wherein said IF, THEN ELSE statement further comprises:

IF (Reset Vector Locator at present Address in present memory block)

THEN (Execute the Reset Vector in present memory block)

ELSE (Execute the Reset Vector in another memory block).

4. The method as claimed in claim 1 wherein said step of scanning memory further comprises a DO WHILE loop.

5. The method as claimed in claim 4 wherein said DO loop further comprises:

DO WHILE (Reset Vector Locator is not in present memory block) (Look at next memory block)

END WHILE (Execute the Reset Vector in present memory block).

6. The method as claimed in claim 1 wherein said step of scanning memory further comprises a DO UNTIL loop.

7. The method as claimed in claim 6 wherein said DO UNTIL loop further comprises:

scanning memory until a valid reset vector locator is found; and executing the reset vector.

8. A conditional deterministic reset vector for a microprocessor having partitioned memory blocks, said conditional deterministic rest vector comprising:

a first application memory block having a reset vector locator, a reset vector and main boot application data;

a second application memory block having a reset vector locator, a reset vector and back-up boot application data;

a plurality of logic commands to search for said reset vector in said first and second application memory blocks; and a plurality of logic commands to execute said reset vector.

9. The microprocessor as claimed in claim 8 wherein said logic commands further comprise an IF, THEN ELSE statement.

10. The microprocessor as claimed in claim 8 wherein said logic commands further comprise a DO WHILE statement.

11. The microprocessor as claimed in claim 8 wherein said logic commands further comprise a DO UNTIL statement.

12. The microprocessor as claimed in 8 wherein said logic commands are etched in a substrate of said microprocessor.

13. The microprocessor as claimed in claim 8 wherein said logic commands are contained in an existing boot strategy for said microprocessor.

* * * * *